United States Patent [19]

Hochstrate

[11] 4,238,793
[45] Dec. 9, 1980

[54] ELECTROLUMINESCENT BACKLIGHT FOR ELECTROOPTIC DISPLAYS

[75] Inventor: Paul Hochstrate, Bristol, Conn.

[73] Assignee: Timex Corporation, Waterbury, Conn.

[21] Appl. No.: 24,934

[22] Filed: Mar. 29, 1979

[51] Int. Cl.³ .............................................. H05B 33/08
[52] U.S. Cl. ................................ 340/781; 315/169.3; 340/716; 340/765; 340/811
[58] Field of Search ............... 340/760, 781, 782, 811; 315/169.3, 283

[56] References Cited

U.S. PATENT DOCUMENTS

| | | | |
|---|---|---|---|
| 3,388,292 | 6/1968 | Burns | 340/782 |
| 3,908,150 | 9/1975 | Webb | 340/760 X |
| 3,918,041 | 11/1975 | Mao | 340/756 |
| 3,992,873 | 11/1976 | Awalt | 340/762 X |
| 4,070,663 | 1/1978 | Kanatani et al. | 340/781 X |

FOREIGN PATENT DOCUMENTS 1201092 8/1970 United Kingdom .
1324353 7/1973 United Kingdom .
1330172 9/1973 United Kingdom .

Primary Examiner—David L. Trafton

[57] ABSTRACT

An electroluminescent (EL) panel for use as a backlight in a passive electrooptical display of the light control type is provided wherein the phosphor bodies in each segment of the panel are excited to luminesce by a low duty cycle pulsed high frequency potential. Power consumption is reduced further by the use of a subdivided EL panel sequentially activated (multiplexed) by the pulsed high frequency potential. The multiplexing frequency is selected to substantially effect a perceived continuous (for as long as needed), evenly distributed source of light coming from all of the segments of the panel. Since the segments are only sequentially excited, the power drain on battery sources of power is greatly reduced without adversely affecting the perceived continuous and evenly distributed level of illumination produced by the panel as a unitary light source.

17 Claims, 7 Drawing Figures

ELECTROLUMINESCENT BACKLIGHT FOR ELECTROOPTIC DISPLAYS

BACKGROUND OF THE INVENTION

This invention relates to an electroluminescent panel or lamp suitable as a backlight source for passive electrooptic displays of the light control type. More particularly, this invention relates to electroluminescent light panels and driving means/methods for electroluminescent light panels.

DESCRIPTION OF THE PRIOR ART

Electric lamps utilizing phosphors have been previously known.

Typically, electroluminescent cells comprise a pair of spaced electrodes with one or more layers of field-responsive phosphor material sandwiched between the two electrodes. When an alternating potential is applied between the two electrodes, the resulting electric field excites the phosphor to luminesce.

However, the main drawback to the commercial use of EL devices as a light source, particularly for use as a backlight in small battery operated devices such as passive electrooptic display type wristwatches, are their relatively poor efficiency in converting electrical energy to light. Another major problem heretofore virtually preventing the use of EL devices as a backlight in passive electrooptic display type wristwatches was the peak (current drain) power demand such devices placed on the battery power supply.

In one prior art device, such as described in U.S. Pat. No. 3,673,572, the electroluminescent device is arrayed in a coordinate pattern with individual areas selectively addressed to form a display pattern of visual data on, for example, a television screen. A stated object and purpose of the invention described in the referenced patent is to provide a data display device with electrically isolated areas to prevent cross talk between selected (energized) and unselected (not energized) areas to prevent disturbing light emission from unselected areas.

In contrast to the prior art devices, the present invention provides a driving arrangement/method for a battery powered electroluminescent light panel which beneficially utilizes cross talk between selected and unselected discrete EL segment areas, and obtains luminescence by means of sequential activation of a segmented EL light panel with periodic bursts of a relatively high frequency AC signal. The duty cycle between bursts and the number of segment areas and refresh rate, i.e., multiplexing frequency, are selected to substantially effect a perceived, continuing evenly distributed (composite) source of light from all of the segments of the panel which are only sequentially excited thereby greatly reducing power drain without adversely affecting the continuous perceivable level of illumination produced by the panel.

The following patents represent some of the prior art pertinent to the field of electroluminescent panels: U.S. Pat. Nos. 2,980,816 issued Apr. 18, 1961 to Elmer Curry Payne; 3,673,572 issued June 27, 1972 to Philip O. Sliva; 4,099,091 issued July 4, 1978 to Hiroshi Yamayoe et al; 3,040,202 issued June 19, 1962 to Willi Lehmann; 3,496,410 issued Feb. 17, 1970 to Alfred J. MacIntyre; 3,914,932 issued Oct. 28, 1975 to Kalsuhiro Teraishi et al; 3,811,751 issued May 21, 1974 to Gary D. Myer; 3,894,389 issued July 15, 1975 to Teiji Miura et al; 3,992,873 issued Nov. 23, 1976 to Rockland Karl Awalt and 4,011,557 issued Mar. 8, 1977 to Fernand Chetelat et al.

These patents are mentioned as being representative of the prior art and other pertinent patents may exist. See, for example, U.S. Pat. No. 3,864,905, issued Feb. 11, 1975 wherein a conventional passive liquid crystal electrooptic display of the light control type is disclosed and which employs an incandescent light bulb as the backlight. The present invention is intended to replace such incandescent bulbs as the backlight in passive electrooptic displays of the light control type.

SUMMARY OF THE INVENTION

Generally speaking, in accordance with the invention, a driving arrangement is provided for energizing an EL light panel to luminesce by sequential activation of a segmented EL panel with periodic bursts of a relatively high frequency alternating electrical signal for providing a continuous light source.

Accordingly, an object of this invention is to provide a new and improved method for energizing an EL cell that can operate as a continuous background light source for a passive electrooptical display for as long as it is needed.

Another object of this invention is to provide a new and improved electrically energized electroluminescent panel employing the above method which operates at high efficiency with low power drain.

A further object of this invention is to provide new and improved arrangements for driving an EL cell to accomplish the above set forth objectives.

A further object of this invention is to provide a new and improved electroluminescent panel or lamp having improved efficiency to enable its use as an illumination source for battery powered electrooptic displays.

A still further object of this invention is to provide a device and method for reducing the peak power demand required to illuminate an EL panel to a predetermined (perceived) illumination.

BRIEF DESCRIPTION OF THE DRAWINGS

Other objects and advantages of this invention may be more clearly seen when viewed in conjunction with the accompanying drawings. Similar reference numerals refer to similar parts throughout.

FIG. 2b shows the impulsing wave forms to the EL panel illustrated in FIG. 2a;

Referring now to FIG. 1 of the drawings, an EL cell 1 is illustrated which generally comprises a transparent outer protective foundation or plastic layer 2 having coated thereon a light-transmitting first electrode 3. Over the first electrode 3 is coated a layer 4 of electroluminescent phosphor material. Over the phosphor layer 4 is a second electrode 5. And over the second electrode 5 is a second protective layer 6. An epoxy seal 7 is used to bind the EL cell together. Electrical lead conductors 8, 9 are electrically connected to the electrodes 3 and 5, respectively, and are adapted to be connected across a source of electrical potential (not shown).

Referring now to FIG. 2a, a subdivided EL panel 10 is shown. Based on investigations of EL panels, it was determined that a direct relationship exists between the surface area of a parallel plate EL panel configuration and the resultant current drain through the device. A basic watch display EL panel, for example, requires in the proximate range of 42 microamperes of current at 60 HZ to produce sufficient backlight illumination to read a liquid crystal display in low or adverse light conditions. By multiplexing the backlight panel, this (peak) current requirement would be divided by the number of discrete segments. For example, if the number of multiplexed segments is chosen as six (3A–3F) then the peak current being drawn is reduced to approximately seven microamperes. It was further discovered that by periodically impulsing the discrete EL panels 3A–3F with a burst of relatively high frequency AC potential, as utilized by the circuit arrangements illustrated in FIGS. 1, 3 and 6, or by a pulsed DC potential, as utilized by the circuit illustrated in FIG. 5, that the current requirement to obtain a desired panel 10 illumination may be further reduced.

Figure 1:
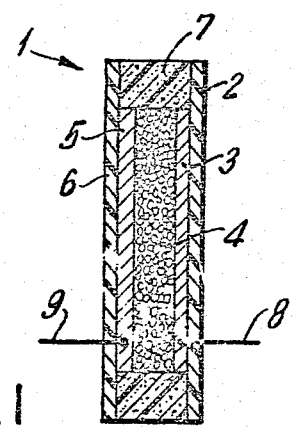
FIG. 1 is a cross-sectional side view of an electroluminescent panel.
Figure 2A:
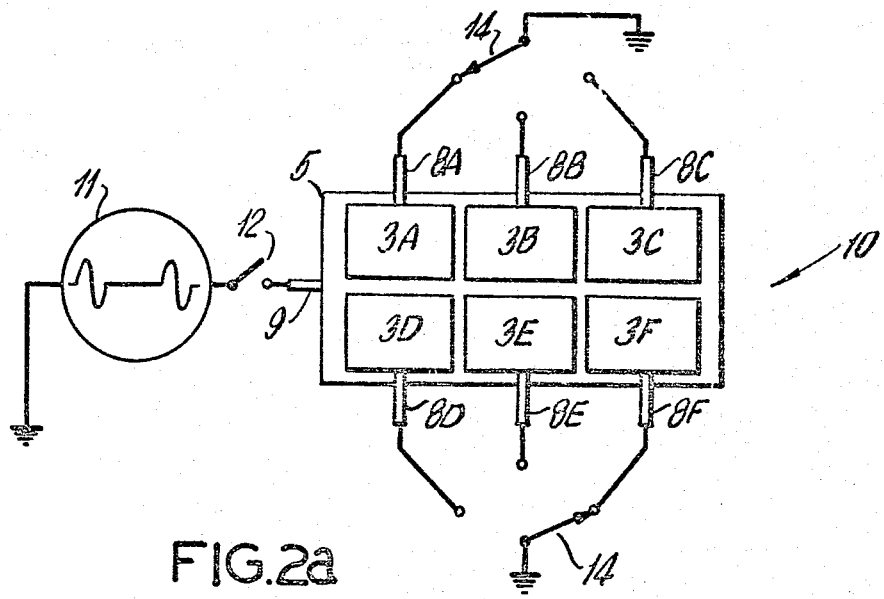
FIG. 2a is a plan view of a multiplexed EL panel impulsed energized in accordance with the present invention.

In the embodiment shown in FIG. 2a, electrode 8 is connected to ground. Electrode 9 is connected to an AC source 11 via a series switch 12. Although switch 12 is shown as a mechanical device, the invention is not intended to be limited thereto. It will occur to those skilled in the art that electronic devices such as transistors or logic circuits could be substituted in lieu thereof.

In accordance with the invention, it has been further determined that a reduction of power, i.e., improved efficiency, can be obtained by impulsing each EL panel 3A–3F with a high frequency-low duty cycle alternating AC or pulsed DC voltage potential. Minimum power requirement is obtained when each cell or panel or segment of the panel is excited by a spurt of at least one cycle as shown at 13 in FIG. 2b of a high frequency alternating potential having, for example, a frequency of between 1 KHZ and 10 KHZ in FIG. 2b with the spurt of high frequency AC potential being applied, at a repetition or refresh rate of slightly greater than the flicker rate of 32 HZ. This yields a duty cycle of approximately 0.3 to 3 percent.

It has been experimentally determined that a spurt or burst of at least one cycle 13 of a high frequency AC voltage potential periodically applied at a repetition rate above the 32 HZ flicker rate is adequate for activation of the phosphors in an EL cell to produce a glow that equals that of a continuous wave activated EL cell. Power requirements of approximately only 3 percent of the continuous wave power requirements have been achieved in accordance with this invention.

Figure 2B:
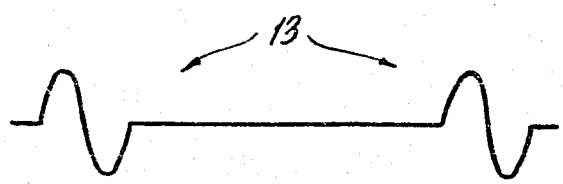

The wave form illustrated in FIG. 2b can be applied selectively across each discrete EL panel 3A–3F by periodically closing the series switch 12 in coincidence with coupling the addressed discrete (segment) EL panel, via switch 14, to reference or ground potential at the greater than 32 HZ repetition rate. Of course, it is assumed that the peak-to-peak voltage of spurt 13 is sufficient for exciting the phosphor layer 4. The control pulses(s) repetition rate and the multiplexing sequence and refresh rate may be calculated or empirically determined such that each EL cell or lamp 3A–3F would not be perceived as flickering due to retinal retention. The predetermined order or sequence of activating discrete EL panels 3A–3F and the refresh or repetition rate for impulsing each EL panel 3A–3F is selected to effect a perceived unitary and uniformly illuminated EL panel 10.

Each segment 3A–3F is disposed on the EL panel 10 and the other or sequence of activation is such that the inherent cross talk or retentivity which the EL panels tend to exhibit is beneficially utilized to obtain an illumination (lamp) panel having substantially uniform and continuous light output, when actuated, with greatly improved efficiency due to lower power consumption. In this manner, the leakage current/energy between the segments 3A–3F is beneficially utilized.

It should be noted at this point in the description that the terms "substantially uniform and continuous light output" and "unitary light or illumination" as used throughout the specification and claims refers to a light source formed or comprising a plurality of constituent (segment) light sources disposed relative to each other and actuated, i.e., excited to luminesce, in a manner to provide a visually perceived single or undivided whole light source or illumination panel.

Figure 3:
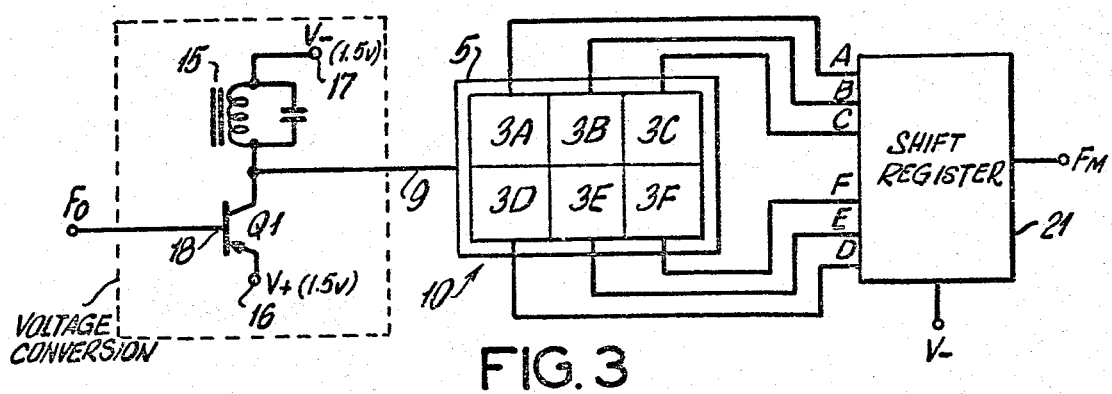
FIG. 3 is a schematic view of one embodiment of the invention.
Figure 4:
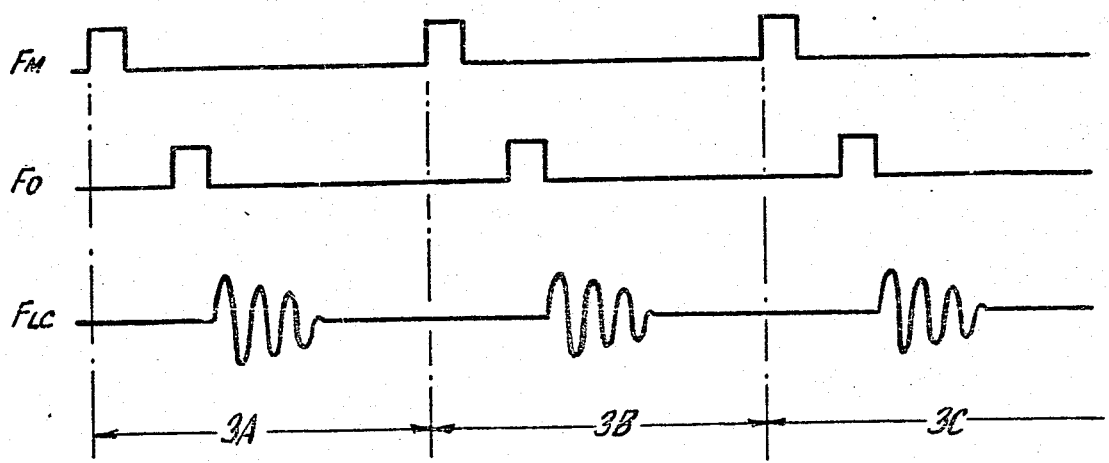
FIG. 4 shows the pulse wave forms of the circuit illustrated in FIG. 3.

Referring now to FIGS. 3 and 4, an embodiment of the present invention is illustrated which has particular application as a passive electrooptic display backlight illumination source in low voltage/power battery operated devices such as watches, calculators, meters and the like.

The EL panel 10 comprises, as noted above, a plurality of discrete (segment) panels 3A–3F and a single common back electrode 5.

The common electrode 5, via electrode lead 9, is coupled between the series connection of an LC tank circuit 15 and the collector of a transistor switch $Q_1$. The tank circuit 15 and the emitter of transistor switch $Q_1$ are connected in series with the negative 17 and positive 16 terminals of a battery power source (not shown). The base (terminal) 18 of the transistor switch $Q_1$ is responsive to a control pulse $F_0$. The LC tank circuit 15 is intermittently impulsed by being periodically coupled, via switch $Q_1$, to the positive and negative terminals 16, 17 of the battery power supply. Switch $Q_1$ is responsive to control pulse(s) $F_0$, whose timing and waveform are shown in FIG. 4, to close the normally non-conductive, i.e., open, switch $Q_1$ to thereby permit a voltage-current pulse(s) to flow through switch $Q_1$ to supply generative or regenerative energy to the LC tank circuit 15. The resonant frequency of the LC tank circuit 15 is predetermined at a relatively high frequency, for example, between 1 KHZ and 10 KHZ. The control pulses $F_0$ are selected at a repetition rate greater than the flicker rate of 32 HZ. The control pulse $F_0$ repetition rate is increased with the number of discrete segment EL panels, for example, to 64 HZ for an EL panel having two segments, to enable each segment EL panel to be energized selectively, via a control address unit such as a shift register 21, at a refresh rate to prevent flickering of the segmented EL panel. In this manner, the LC tank circuit 15 is periodically impulsed to generate a spurt or burst $F_{LC}$ of at least one relatively high frequency voltage oscillation shown in FIG. 4 which is coupled, via electrode lead 9, to the common electrode 5 of the segment EL panel 10.

The segmented panels 3A–3F are sequentially or selectively addressed by means of a ring counter or shift register 21. The ring counter 21 is advanced by multiplexing pulses $F_M$, whose waveform and timing relative to control pulses $F_O$ is shown in FIG. 4, to sequentially couple, via outputs A-F, a segmented panel(s) 3A-3F to the negative terminal 17 of the battery power supply. The segmented panels 3A-3F are addressed or coupled to the negative voltage terminal 17 to effect coincidences with the bursts $F_{LC}$ of AC potential being applied to the common electrode 5. Thus, by means of coincident application of the negative or reference potential V— of terminal 17 to a discrete segment electrode, for example, 3A, via ring counter 21, and the common electrode 5 to the AC potential oscillations $F_{LC}$, the phosphor bodies between the common and discrete segment electrodes 3A are excited to luminesce.

In this manner, a relatively high voltage, high frequency AC signal or spurt of signals having a low duty cycle between spurts is derived from a relatively low voltage DC battery source, for example, of a watch. The number of discrete segment EL panels 3A-3F, the control pulse repetition rate $F_0$, the multiplexing frequency $F_m$, i.e. refresh rate of each panel 3A-3F, and the sequence or order of activating the panels 3A-3F may be empirically selected to effect perceived uniform (flicker-free) illumination of the entire EL panel 10.

Figure 5:
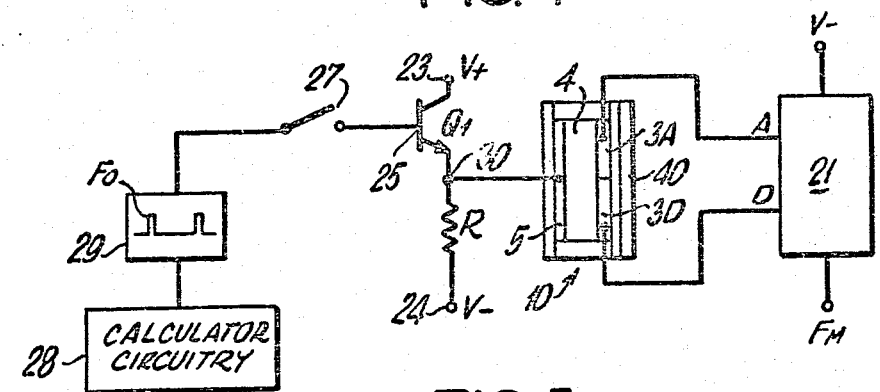
FIGS. 5 and 6 are circuit diagrams of alternative embodiments of the invention.

With reference to FIG. 5, an alternative embodiment of the driving arrangement for the segmented EL panel 10 is illustrated. A multiplexing arrangement 21 for addressing each discrete EL segment panel 3A-3F similar to that described in connection with FIG. 3 is contemplated, although not shown, with this embodiment of the invention. The EL panel common 5 is coupled to the junction point 30 between the emitter of a transistor switch $Q_1$ and a resistance R. The collector of switch $Q_1$ and the other end of resistance R are connected to the positive and negative terminals 23 and 24, respectively, of a two battery or split battery power source (not shown). The two battery power source consists of a series configuration of two, e.g., lithium, battery cells which, in accordance with this embodiment of the invention, supplies the necessary voltage potential for exciting the phosphor of the EL panels 10 without voltage boosting techniques.

As noted above, the segment EL panel electrodes 3A-3F are selectively coupled by multiplexing arrangement 21, in a predetermined order or sequentially, to the negative terminal 24 of the power source.

The base electrode 25 of switch $Q_1$, is supplied with control pulses $F_0$ from a control pulse source 29, via a manually actuatable switch 27. Switch 27 is, for example, manually actuatable by an actuator mounted on a timepiece (not shown) or by a calculator (not shown) and is closed for as long as the background illumination is needed by a viewer. The control pulses are derived from the timepiece or calculator circuitry 28, via a pulse shaper circuit that comprises the control pulse source 29, well known in the art.

The switch $Q_1$ is responsive to each control pulse, and closes in response to each pulse $F_0$. When switch $Q_1$ closes, the voltage potential at point 30 increases substantially to the potential at terminal 23. This coupling of the EL panel common 5 to the positive terminal 23 in coincidence with a segment EL panel 3A-3F being coupled to the negative terminal 24 by multiplexing arrangement 21 provides the impulsing of the EL panel to effect luminescence of the phosphor material therebetween. As described above, the segment EL panels are selectively energized to obtain a perceived single EL backlight panel.

Figure 6:
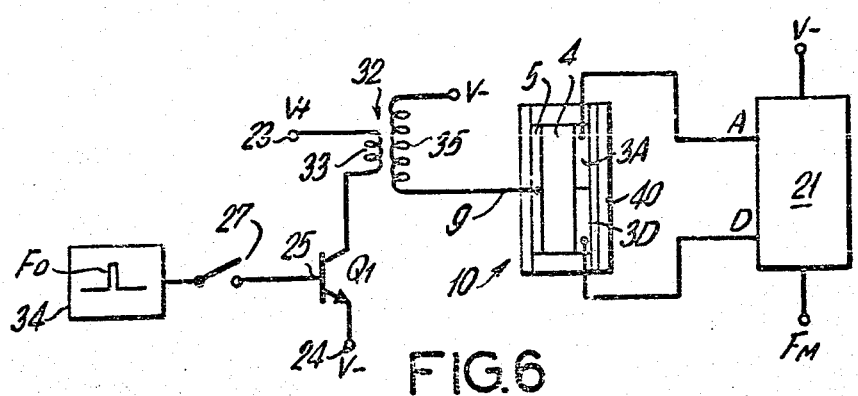

With reference to FIG. 6, another embodiment of the invention is illustrated. The embodiment shown in FIG. 6 is similar to the embodiments described in connection with FIGS. 3 and 5, with the exception that the drive circuit arrangement to the common electrode 5 is impulsed by a piezoelectric transponder/transformer 32. A transistor switch $Q_1$ is connected in series between a terminal of the transformer primary winding 33 and a negative terminal 24 of a battery power source (not shown). The other terminal end of the primary 33 is connected to a positive terminal 23 of the battery power source. Switch $Q_1$ is responsive to control signal pulses $F_0$ from, e.g., an electrooptic display 40 type wristwatch 34 for impulsing the primary 33 with voltage/current pulses from the battery power source. The operation of this embodiment is similar to the embodiments shown in FIGS. 3 and 5 except that the common electrode 5 is impulsed from the secondary winding 35. In this manner, a step-up voltage driver arrangement is provided for exciting the EL material between the selected segments 3A-3F of the segmented (light) panel 10.

While a wide variety of types of EL panels, inductors, transistors, frequencies, voltage-batteries and associated elements may be employed, the circuit components for the embodiments in FIGS. 3, 5 and 6 are as follows:

| COMPONENTS | FIG. 3 | FIG. 5 | FIG. 6 |
| --- | --- | --- | --- |
| Voltage source | 1.5 Volts | 300 Volts | 1.5 Volts |
| Tank circuit | 68 uH | | |
| | 0.02 uf | | |
| Inductor | 110 KHERTZ | | |
| Capacitance | | | |
| $F_{LC}$ | | | |
| Transducer/transformer | | | |
| Primary Voltage | 0.96 VRMS | | 1.5/26V |
| Secondary Voltage | 7 ;a RMS | | |
| Switch $Q_1$ | 2N4401 | 6AQ5 | 2N4401 |
| Frequency/repetition rate | | | |
| $F_o$ | 110 KHERTZ | 10KHZ | 205KHZ |
| $F_m$ | 32 HERTZ | 32HZ | |
| $F_o$ duty cycle | 50% | 50% | 50% |
| $F_m$ duty cycle | 0.2% | 0.3% | |

While there has been described herein what is considered to be the preferred embodiments of the invention, other modifications may occur to those skilled in the art, and it is intended that the appended claims are to cover all such modifications which fall within the true spirit and scope of the invention as defined by the appended claims.

What is claimed is:

1. An illumination-panel/device for use as the backlight in a passive electrooptic display of the light control type comprising:
   an electroluminescent panel having at least one side thereof light transmissive for providing an evenly distributed source of light and having a plurality of segment electrodes, a common electrode and electroluminescent material interposed between said segment and common electrodes; and
   means for applying an electrical field sequentially across each segment electrode and the common electrode at a predetermined repetition rate greater than the decay rate of electroluminescent material such that said panel is continuously illuminated over a desired period of operation and functions as a unitary backlight source for the display.

2. An illumination panel/device as in claim 1, wherein:
the segment electrodes are juxtaposed to each other; and
the means applies an electrical potential sequentially to each segment electrode and coincidentally to the common electrode at a repetition rate greater than the decay rate of the electroluminescent material whereby the electroluminescent panel is excited to provide a perceived non-flickering unitary light panel.

3. An illumination-panel/device as in claim 2, wherein:
the means applies an electrical potential sequentially to each segment electrode at a periodic repetition rate of at least thirty-two hertz and applies an co-acting electrical potential to the common electrode at a corresponding rate whereby a coincidental electric field is established across said segment electrodes and the common electrode to provide the perceived non-flickering unitary light panel.

4. An illumination-panel/device for a passive electrooptic display and the like comprising:
an electroluminescent panel having at least one side thereof light transmissive for providing a source of light and having a plurality of juxtaposed segment electrodes, a common electrode and electroluminescent material interposed between each said segment and common electrode; and
circuit means for sequentially and repetitively applying electrical potential to each segment electrode at a predetermined repetition rate greater than the decay rate of the electroluminescent material, and for coincidentally applying a coacting electrical potential to the common electrode at a correspondingly repetition rate;
whereby a recurrent electricaL field is sequentially established across each said segment and common electrodes for exciting the electroluminescent material therebetween at the predetermined rate to effect perceived non-flickering unitary illumination of said panel.

5. An illumination-panel/device as in claim 4, wherein:
the circuit means comprises a switch connected in series circuit with a tank circuit and a battery power source, the circuit connection between the switch and the tank circuit is coupled to the common electrode, said switch being responsive to a control signal for intermittently coupling said tank circuit across said battery power source at the predetermined repetition rate whereby said tank circuit is excited into relatively high frequency high potential oscillation, and segment actuation means for sequentially applying an electrical potential to said segment electrodes at the predetermined repetition rate.

6. An illumination-panel/device as in claim 5, wherein:
the segment actuation means is a ring counter responsive to a multiplexing signal for coupling a terminal of said battery power source to each segment electrode for a predetermined period at the predetermined repetition rate.

7. An illumination-panel/device as in claim 5, wherein:
the segment actuation means is a shift register responsive to a multiplexing signal for coupling a terminal of said battery power source to each segment electrode for a predetermined period at the predetermined repetition rate.

8. An illumination-panel/device as in claim 4, wherein:
the circuit means comprises a switch means in series circuit with a resistance means and a battery power source, the circuit connection between the switch means and the resistance means is coupled to the common electrode, said switch means being responsive to a control signal for intermittently coupling said resistance means across said battery power source at the predetermined repetition rate for applying an electrical potential impulse to the common electrode, and segment actuation means responsive to a multiplexing signal for sequentially applying a predetermined potential to said segment electrodes at the predetermined repetition rate.

9. An illumination-panel/device as in claim 8, wherein:
the control signal and the multiplexing signal are derived from a timekeeping circuit.

10. An illumination-panel/device as in claim 4 wherein:
the circuit means comprises a transformer having its primary winding connected in series circuit with a switch means and a battery power source, said switch means being responsive to a timepiece control signal for intermittently coupling said primary winding across said battery power source at the predetermined repetition rate, a transfer secondary winding inductively coupled to said primary winding and having one of its terminal ends connected to the common electrode and another terminal end connected to a terminal of the battery power source, said primary winding being impulsed upon said switch means closing in response to a control pulse at the predetermined repetition rate to induce a relatively high voltage across said secondary winding for application to said common electrode, and a segment actuation means for sequentially applying a predetermined electrical potential to said segment electrodes at the predetermined repetition rate in response to a multiplexing signal.

11. A backlight device for a passive electrooptic display for a battery powered timepiece comprising:
an electroluminescent panel for providing an evenly distributed source of light having a plurality of juxtaposed segment electrodes, a common electrode and electroluminescent material interposed between each said segment and common electrodes;
circuit means responsive to a signal from said timepiece for applying a predetermined electrical potential sequentially to each segment electrode at a predetermined repetition rate greater than the decay rate of the electroluminescent material and for impulsing the common electrode at a corresponding rate in response to actuation of a manually actuatable switch whereby a recurrent electrical field is provided across said segment and common electrodes at the predetermined repetition rate for exciting the electroluminescent material therebetween at the predetermined rate to effect unitary illumination of said panel during the period of closure of the manually actuable switch.

12. The method of employing an electroluminescent panel as a visually perceived continuous unitary light source having low electric power consumption requirements wherein the electroluminescent panel has at least one light transmissive side and is comprised by a plurality of juxtaposed segment electrodes, a common electrode and electroluminescent material interposed between each segment electrode and the common electrode; said method comprising sequentially and repetitively applying an electric potential to each segment electrode at a predetermined repetition rate greater than the decay rate of the electroluminescent material and concurrently and repetitively connecting the common electrode in circuit relationship with the electric potential at a corresponding repetition rate whereby a recurrent electric field is sequentially and repetitively established across each segment and the common electrode for exciting the electroluminescent material therebetween to luminescence at the predetermined repetition rate to thereby effect perceived non-flickering illumination of said panel as a unitary light source.

13. The method according to claim 12 wherein the predetermined repetition rate is about thirty-two hertz or greater.

14. The method according to claim 12 wherein the electric potential is provided from a battery source and the battery power source is disconnected from the electroluminescent panel during periods of non-use.

15. The method according to claim 13 wherein the electric potential is provided from a battery source and the battery power source is disconnected from the electroluminescent panel during periods of non-use.

16. The method according to claim 12 wherein the electric potential is electrically isolated from the electroluminescent panel during periods of non-use of said panel as a light source for electrical energy conservation purposes.

17. The method according to claim 13 wherein the electric potential is electrically isolated from the electroluminescent panel during periods of non-use of said panel as a light source for electrical energy conservation purposes.

* * * * *